(12) United States Patent
Liang et al.

(10) Patent No.: US 9,701,811 B2
(45) Date of Patent: Jul. 11, 2017

(54) TOUGHENED, CURABLE EPOXY COMPOSITIONS FOR HIGH TEMPERATURE APPLICATIONS

(71) Applicant: Blue Cube IP LLC, Midland, MI (US)

(72) Inventors: Yi L. Liang, Pearland, TX (US); Lameck Banda, Manvel, TX (US); Rui Xie, Pearland, TX (US)

(73) Assignee: BLUE CUBE IP LLC, Midland, MI (US)

( * ) Notice: Subject to any disclaimer, the term of this patent is extended or adjusted under 35 U.S.C. 154(b) by 0 days.

(21) Appl. No.: 14/423,947

(22) PCT Filed: Oct. 10, 2013

(86) PCT No.: PCT/US2013/064291
§ 371 (c)(1),
(2) Date: Feb. 25, 2015

(87) PCT Pub. No.: WO2014/062475
PCT Pub. Date: Apr. 24, 2014

(65) Prior Publication Data
US 2015/0210906 A1    Jul. 30, 2015

Related U.S. Application Data

(60) Provisional application No. 61/714,968, filed on Oct. 17, 2012.

(51) Int. Cl.
*C08K 5/1539*    (2006.01)
*C08K 5/41*    (2006.01)
*C08L 63/00*    (2006.01)

(52) U.S. Cl.
CPC ............. *C08K 5/1539* (2013.01); *C08K 5/41* (2013.01); *C08L 63/00* (2013.01)

(58) Field of Classification Search
CPC .............................. C08L 63/00; C08K 5/1539
See application file for complete search history.

(56) References Cited

U.S. PATENT DOCUMENTS

| 2009/0048370 A1* | 2/2009 | Lutz ........................ C08L 63/00 523/428 |
| 2011/0037028 A1 | 2/2011 | Valette et al. |
| 2011/0184091 A1 | 7/2011 | Mizuki et al. |

FOREIGN PATENT DOCUMENTS

| EP | 0486516 A1 | 5/1992 |
| WO | 2011/163282 A2 | 12/2011 |

OTHER PUBLICATIONS

Clarke, J. A.,"Rubber toughening of oxazolidinone modified epoxy novolac", Advances in Chemistry, Dec. 5, 1984, vol. 208, Chapter 5, pp. 51-63.
PCT/US2013/064291,International Search Report & Written Opinion mailed May 8, 2014.
PCT/US2013/064291, International Preliminary Report on Patentability mailed Apr. 30, 2015.

* cited by examiner

*Primary Examiner* — Megan McCulley
(74) *Attorney, Agent, or Firm* — Polsinelli PC

(57) ABSTRACT

A composition comprising: (a) an epoxy resin composition comprising: (i) a first epoxy component comprising an epoxy resin having at least one oxazolidone ring structure; and (ii) a second epoxy component selected from the group consisting of a liquid epoxy resin, a divinylarene dioxide, and combinations thereof; (b) a core-shell rubber comprising a rubber particle core and a shell layer, and (c) a hardener, is disclosed.

16 Claims, 1 Drawing Sheet

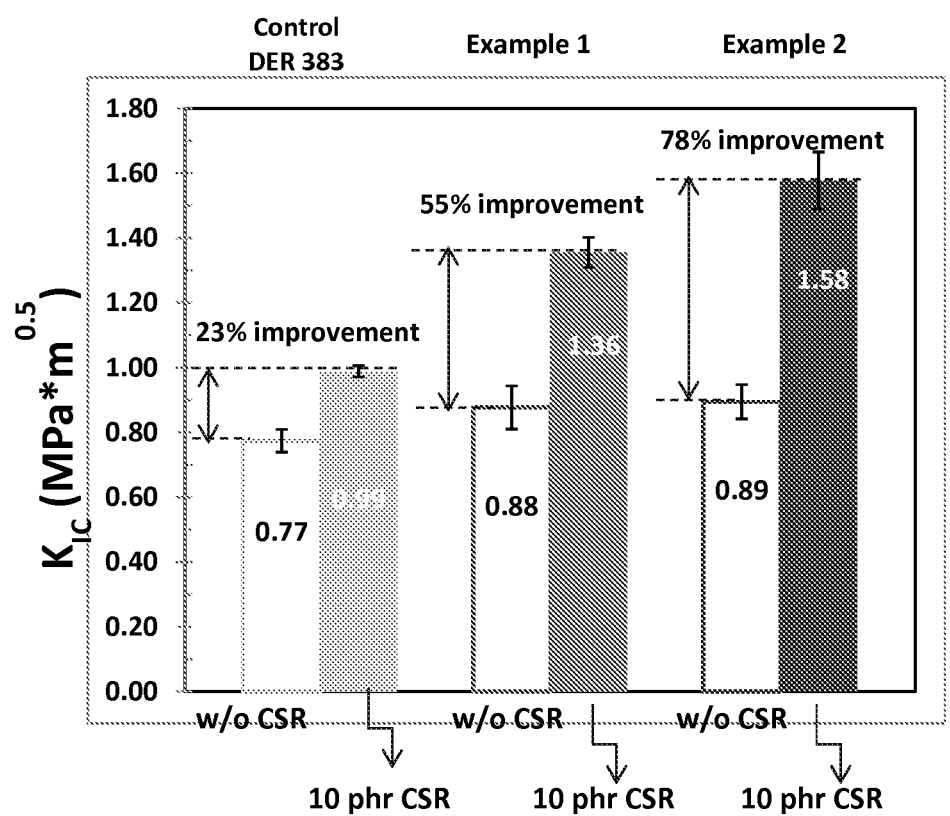

TOUGHENED, CURABLE EPOXY COMPOSITIONS FOR HIGH TEMPERATURE APPLICATIONS

FIELD OF THE INVENTION

The present invention is related to epoxy resins. In particular, the present invention is related to curable epoxy resin compositions for high temperature applications.

BACKGROUND

Toughening with rubber-containing compounds has been applied to enhance the poor crack-propagation resistance in brittle epoxy thermosets. Incorporating a small amount (typically ≤15 wt %) of discontinuous rubber phase has been known for its effectiveness to toughen epoxy thermosets with glass transition temperature ($T_g$) in the range of 50° C.<$T_g$<130° C. This enhancement is attributed to the development of the process zone, consisting of plastic deformations, located in front of the crack tips. The development of the process zone, triggered by cavitated rubber particles, dissipates the strain energy prior to the crack initiation. As a result, the crack propagation under mechanical loading is impeded, and the tendency of material catastrophic failure is improved.

However, this rubber toughening technique does not always deliver an efficient enhancement in fracture toughness ($K_{IC}$) in high $T_g$ ($T_g$>150° C.) epoxy thermosets. It is known that the highly crosslinked network structures in those epoxy thermosets further restrict the chain movement so that their $T_g$ values are high. The highly crosslinked network structures may also confine the propensity of process-zone development when the rubber toughening technique is applied. Therefore, the toughenability, $\Delta K_{IC}$ ($K_{IC\ toughend}-K_{IC\ untoughened}$), and high $T_g$ is one of the well-known dilemmas for the "rubber filled" epoxy thermosets.

Engineering thermoplastics such as polyethersulfones and polyetherimides have also been used for improving toughness of the epoxy thermosets. This method includes dissolving large amounts of thermoplastics into the epoxy resin, subsequently mixing a hardener into the mixture, and curing the composition at an elevated temperature. However, incorporation of the thermoplastic into epoxies often takes a significant amount of time. It also leads to a dramatic increase in viscosity and lower modulus in the epoxy thermoset. Therefore, it is desired to limit the usage of engineering thermoplastics that lead to insufficient toughness improvement in epoxy thermosets.

The objective of this invention is to provide a curable epoxy resin composition that possesses good toughness and heat resistance. This epoxy composition can be used in applications such as electrical laminates, epoxy molding compounds, coatings, and fiber reinforced polymer composites.

SUMMARY OF THE INVENTION

In an embodiment of the present invention, there is disclosed a composition comprising, consisting of, or consisting essentially of (a) an epoxy resin composition comprising (i) a first epoxy component comprising an epoxy resin having at least one oxazolidone ring structure and (ii) a second epoxy component selected from the group consisting of a liquid epoxy resin, a divinylarene dioxide, and combinations thereof; (b) a core-shell rubber comprising a rubber particle core and a shell layer, and (c) a hardener.

BRIEF DESCRIPTION OF THE DRAWING

FIG. 1 shows the difference in toughenability between the comparative example and Examples 1 and 2.

DETAILED DESCRIPTION OF THE INVENTION

Epoxy Resin Composition

The epoxy resin composition (a) generally comprises (i) a first epoxy component comprising an epoxy resin having at least one oxazolidone ring structure and (ii) a second epoxy component selected from the group consisting of a liquid epoxy resin, a divinylarene dioxide, and combinations thereof.

Oxazolidone Ring-Containing Epoxy Resin

The composition contains an isocyanate-modified, oxazolidone ring-containing epoxy resin. In an embodiment, the oxazolidone ring-containing epoxy resin is a solid epoxy resin. In an embodiment, the solid epoxy resin is not an epoxy novolac resin. The solid epoxy resin generally has an epoxide equivalent weight (EEW) in the range of from 80 grams/equivalent to 1200 grams/equivalent.

The epoxy resin contains at least one oxazolidone ring. Epoxy-terminated polyoxazolidones are prepared by reacting an epoxy resin with a polyisocyanate compound using a stoichiometric excess of epoxy resin (isocyanate/epoxide ratio lower than 1). The reactions are typically carried out in the presence of a catalyst. Further information on the preparation of oxazolidone ring-containing epoxies can be found in U.S. Pat. Nos. 4,658,007 and 5,112,932.

In general, the polyisocyanate compound used to advance the epoxy resin has an isocyanate functionality of about 2.0 to about 6.0, preferably between about 2.0 to about 4.0, more preferably between 2.0 to about 3.0.

Examples of suitable polyisocyanates include 2,4' diphenylmethane diisocyanate and 4,4' diphenylmethane diisocyanate (MDI) toluene disocyanate (TDI), and xylylene disocyanate (XDI); alphatic diisocyanate (comprising alicyclic diisocyanate) such as hexamethylene diisocyanate (HMDI), isophorone diisocyanate (IPDI), 4,4' methylenebis (cyclohexylisocyanate), trimethyl hexamethylene diisocyanate, dianisidine diisocyanate, toluidine diisocyanate, m-xylyene diisocyanate, 1,5-naphthylene diisocyanace, p-phenylene diisocyanate, 1,4-diethylbenzene-beta, beta' diisocyanate, bexamethylene diisocyanate, dimers, trimers and mixtures of the above.

Preferred examples of the polyisocyanates include 4,4'diphenylmethane diisocyanate (MDI) and isomers thereof, polymeric MDI, and toluene disocyanate (TDI) and isomers thereof, any mixture thereof or the like.

Examples of commercially available polyisocyanate suitable for the present invention include ISONATE™ M124, ISONATE™ M125, ISONATE™ M143, ISONATE™ OP50, VORANATE™ T-80, and VORANATE™ M220 available from The Dow Chemical Company.

Examples of epoxy resins that can be modified by an isocyanate include, but are not limited to polyglycidyl ethers, such as addition products of polyhydric phenols, for example, bisphenol A, bisphenol F, biphenol and phenol novolac and epichlorohydrin; polyvalent glycidyl Examples of epoxy resins amine compounds derived from monoamines and polyamines such as aniline, diamino benzene, aminophenol, phenylene diamine and diaminophenyl ether;

cycloaliphatic epoxy resins; addition products of polyhydric alcohols and epichlorohydrin; halogenated epoxy resins obtained by substituting a portion of hydrogen atoms with halogen elements, such as bromine; homopolymers or copolymers of monomers including unsaturated monoepoxide such as aryl glycidyl ether. The epoxides may be used alone or as a mixture of two or more of them. Examples of the polyepoxide further include those described in U.S. Pat. Nos. 4,431,782, 3,804, 735, 3,892, 819, 3,948,698 and 4,014,771. Specific examples include the novolacs of phenol, cresol, dimethylphenols, p-hydroxybiphenyl, naphthol and bromophenols. The epoxy resins useful in this invention have an epoxide equivalent weight from 80 grams/equivalent to 1200 grams/equivalent.

Commercial examples of solid epoxy resins that contain at least one oxazolidone ring that can be used in embodiments of the present invention include, but are not limited to D.E.R.™ 858, D.E.R.™ 6508, D.E.R.™ 6510 HT, chlorinated or brominated products such as D.E.R.™ 592 and D.E.R.™ 593 available from the Dow Chemical Company, Midland Mich. In an embodiment, the solid epoxy resin containing at least one oxazolidone ring is a MDI-modified bisphenol A epoxy resin, D.E.R.™ 858.

It is preferred that the contents of the first epoxy component (i) is in the range of from 20 to 80 weight percent based on the total weight of epoxy resin composition, component (A), and is in the range of from 30 to 70 weight percent in another embodiment. If the content is smaller than 20 weight percent, the fracture toughness can be less enhanced. If the content is larger than 80 weight percent, the viscosity of the epoxy resin composition may become too high for some applications, and therefore difficult to process in the production of a fiber reinforced polymer composite.

Examples of liquid epoxy resins include, but are not limited to, bisphenol A, bisphenol F, phenol novolac, cycloaliphatic, biphenol epoxy resins, divinylarene dioxide; addition products of polyhydric alcohols and epichlorohydrin. The liquid epoxy resin can be used alone or as a mixture of two or more of them. Commercial examples include, but not limited to, D.E.R.™ 331, D.E.R.™ 332, D.E.R.™ 383 (bisphenol A), D.E.N.™ 438, D.E.N.™ 439 (phenol novolac) produced by Dow Chemical Company; EPON™ 825 (bisphenol A), EPON™ 862 (bisphenol F), EPON™ 154 (phenol novolac), EPONEX™ 1510 (cycloaliphatic) from Momentive Specialty Chemicals Inc.; JER™ YX4000H (biphenol) from Mitsubishi Chemical.

The divinylarene dioxide useful in the present invention may comprise, for example, any substituted or unsubstituted arene nucleus bearing one or more vinyl groups in any ring position. For example, the arene portion of the divinylarene dioxide may consist of benzene, substituted benzenes, (substituted) ring-annulated benzenes or homologously bonded (substituted) benzenes, or mixtures thereof. The divinylbenzene portion of the divinylarene dioxide may be ortho, meta, or para isomers or any mixture thereof. Additional substituents may consist of $H_2O_2$-resistant groups including saturated alkyl, aryl, halogen, nitro, isocyanate, or RO— (where R may be a saturated alkyl or aryl). Ring-annulated benzenes may consist of naphthlalene, tetrahydronaphthalene, and the like. Homologously bonded (substituted) benzenes may consist of biphenyl, diphenylether, and the like.

The divinylarene dioxide (DVBDO) used for preparing the composition of the present invention may be illustrated generally by general chemical Structures I-IV as follows:

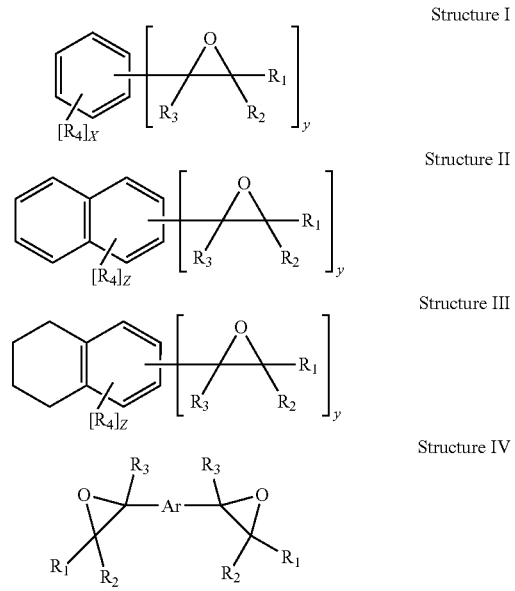

In the above Structures I, II, III, and IV of the divinylarene dioxide comonomer of the present invention, each $R_1$, $R_2$, $R_3$ and $R_4$ individually may be hydrogen, an alkyl, cycloalkyl, an aryl or an aralkyl group; or a $H_2O_2$-resistant group including for example a halogen, a nitro, an isocyanate, or an RO group, wherein R may be an alkyl, aryl or aralkyl; x may be an integer of 0 to 4; y may be an integer greater than or equal to 2; x+y may be an integer less than or equal to 6; z may be an integer of 0 to 6; and z+y may be an integer less than or equal to 8; and Ar is an arene fragment including for example, 1,3-phenylene group. In addition, R4 can be a reactive group(s) including epoxide, isocyanate, or any reactive group and Z can be an integer from 0 to 6 depending on the substitution pattern.

In an embodiment, the divinylarene dioxide used in the present invention may be produced, for example, by the process described in U.S. Patent Application Publication No. 2011/0251412 A1. The divinylarene dioxide compositions that are useful in the present invention are also disclosed in, for example, U.S. Pat. No. 2,924,580.

In another embodiment, the divinylarene dioxide useful in the present invention may comprise, for example, divinylbenzene dioxide, divinylnaphthalene dioxide, divinylbiphenyl dioxide, divinyldiphenylether dioxide, and mixtures thereof.

In a preferred embodiment of the present invention, the divinylarene dioxide used in the epoxy resin formulation may be for example divinylbenzene dioxide (DVBDO). Most preferably, the divinylarene dioxide component that is useful in the present invention includes, for example, a divinylbenzene dioxide as illustrated by the following chemical formula of Structure V:

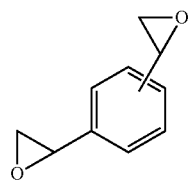

The chemical formula of the above DVBDO compound may be as follows: $C_{10}H_{10}O_2$; the molecular weight of the DVBDO is about 162.2; and the elemental analysis of the DVBDO is about: C, 74.06; H, 6.21; and O, 19.73 with an epoxide equivalent weight of about 81 g/mol.

Divinylarene dioxides, particularly those derived from divinylbenzene such as for example divinylbenzene dioxide (DVBDO), are class of diepoxides which have a relatively low liquid viscosity but a higher rigidity and crosslink density than conventional epoxy resins.

Structure VI below illustrates an embodiment of a preferred chemical structure of the DVBDO useful in the present invention:

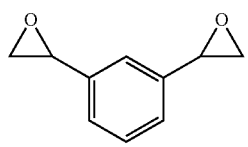

Structure VI

Structure VII below illustrates another embodiment of a preferred chemical structure of the DVBDO useful in the present invention:

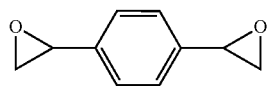

Structure VII

When DVBDO is prepared by the processes known in the art, it is possible to obtain one of three possible isomers: ortho, meta, and para. Accordingly, the present invention includes a DVBDO illustrated by any one of the above Structures individually or as a mixture thereof. Structures VI and VII above show the meta (1,3-DVBDO) isomer and the para (1,4-DVBDO) isomer of DVBDO, respectively. The ortho isomer is rare; and usually DVBDO is mostly produced generally in a range of from about 9:1 to about 1:9 ratio of meta (Structure VI) to para (Structure VII) isomers. The present invention preferably includes as one embodiment a range of from about 6:1 to about 1:6 ratio of Structure VI to Structure VII, and in other embodiments the ratio of Structure VI to Structure VII may be from about 4:1 to about 1:4 or from about 2:1 to about 1:2.

In yet another embodiment of the present invention, the divinylarene dioxide may contain quantities (such as for example less than about 20 wt %) of substituted arenes. The amount and structure of the substituted arenes depend on the process used in the preparation of the divinylarene precursor to the divinylarene dioxide. For example, divinylbenzene prepared by the dehydrogenation of diethylbenzene (DEB) may contain quantities of ethylvinylbenzene (EVB) and DEB. Upon reaction with hydrogen peroxide, EVB produces ethylvinylbenzene monoxide while DEB remains unchanged. The presence of these compounds can increase the epoxide equivalent weight of the divinylarene dioxide to a value greater than that of the pure compound.

In one embodiment, the divinylarene dioxide useful in the present invention comprises, for example, divinylbenzene dioxide (DVBDO), a low viscosity liquid epoxy resin. The viscosity of the divinylarene dioxide used in the process of the present invention ranges generally from about 0.001 Pa s to about 0.1 Pa s, preferably from about 0.01 Pa s to about 0.05 Pa s, and more preferably from about 0.01 Pa s to about 0.025 Pa s, at 25° C.

Generally, the second epoxy component is present in component (A) in an amount in the range of from 20 weight percent to 80 weight percent, based on the total weight of component (A). In another embodiment, the second epoxy component is present in an amount in the range of from 30 weight percent to 60 weight percent, based on the total mass of component (A). If the content is smaller than the 20 weight %, the viscosity of the epoxy resin composition can become too high, and the heat resistance and the productivity in the production of the fiber reinforced polymer composite may decline. If the content is greater than 80 weight percent, the crack propagation resistance and the plastic deformability of the epoxy thermoset declines since the network structure of the epoxy thermoset is densely cross-linked.

In an embodiment, epoxy composition, component (A), is present in the composition in an amount in the range of from 40 weight percent to 95 weight percent, and is present in the composition in an amount in the range of from 50 weight percent to 80 weight percent in another embodiment, based on the total weight of the composition.

Core Shell Rubber

The second component is a core shell rubber comprising a rubber particle core and a shell layer. In an embodiment, the core shell rubber has a particle size in the range of from 0.01 μm to 0.8 μm in an embodiment, from 0.05 μm to 0.5 μm in another embodiment, and from 0.08 μm to 0.30 μm in yet another embodiment. The core shell rubber is a polymer comprising a rubber particle core formed by a polymer comprising an elastomeric or rubbery polymer as a main ingredient, optionally an intermediate layer formed with a monomer having two or more double bonds and coated on the core layer, and a shell layer formed by a polymer graft polymerized on the core or on an intermediate layer. The shell layer partially or entirely covers the surface of the rubber particle core by graft polymerizing a monomer to the core.

In an embodiment, the rubber content in the rubber particle core is generally at least 60 weight percent, at least 80 weight percent in another embodiment, at least 90 weight percent in another embodiment and at least 95 weight percent in yet another embodiment.

In an embodiment, the polymer constituting the rubber particle core is made from an elastomeric material comprising from 50 weight percent to 100 weight percent of at least one member selected from diene monomers (conjugated diene monomers) and (meth)arcylic acid ester monomers and 0 to 50 weight percent of other copolymerizable vinyl monomers, polysiloxane type elastomers or combinations thereof. The term '(meth)acryl' is defined as acryl and/or methacryl.

The diene monomer (conjugated diene monomer) constituting the elastomeric material can include but is not limited to, for example, butadiene, isoprene and chloroprene. In an embodiment, butadiene is used. Further, the (meth)acrylic ester monomer can include, for example, butyl acrylate, 2-ethylhexyl acrylate and lauryl methacrylate. In another embodiment, butyl acrylate or 2-ethylhexyl acrylate can be used. They can be used alone or in combination.

Further, the above-mentioned elastomeric materials of a diene monomer or (meth)acrylate ester monomer can also be a copolymer of a vinyl monomer copolymerizable therewith. The vinyl monomer copolymerizable with the diene monomer or (meth)arcylic ester monomers can include, for example, aromatic vinyl monomers and vinyl cyanate monomers. Examples of aromatic vinyl monomers that can be used include but are not limited to styrene, α-methylstyrene, and vinyl naphthalene, while examples of vinyl cyanate monomers that can be used include but are not limited to (meth)acrylonitrile and substituted acrylonitrile. The aromatic vinyl monomers and vinyl cyanate monomers can be used alone or in combination.

In an embodiment, the amount of the diene monomer or (meth)arcylic ester monomer used is at least 50 weight percent and, in another embodiment, at least 60 weight percent based on the entire weight of the elastomeric material. If the amount of the diene monomer or (meth)arcylic ester monomer to be used for the entire rubber elastomer is less than 50 weight percent, the ability of the polymer particles to toughen a polymer network, such as a cured epoxy matrix, is decreased. On the other hand, the amount of the monomer copolymerizable therewith is, in an embodiment, 50 weight percent or less and, in another embodiment, 40 weight percent or less based on the entire weight of the elastomeric material.

Further, as an ingredient constituting the elastomeric material, a polyfunctional monomer may also be included for controlling the degree of crosslinking. The polyfunctional monomer can include, for example, divinylbenzene, butanediol di(meth)acrylate, triallyl(iso)cyanurate, allyl (meth)acrylic, diallyl itaconate, and diallyl phthalate. The polyfunctional monomer can be used in an amount of 10 weight percent or less, 3 weight percent or less in another embodiment, and 0.3 weight percent or less in yet another embodiment, based on the entire weight of the elastomeric material. In the case where the amount of the polyfunctional monomer exceeds 10 weight percent, the ability of the polymer particles to toughen a polymer network, such as cured epoxy matrix is decreased.

Optionally, a chain transfer agent may be used for controlling the molecular weight or the crosslinking density of the polymer constituting the elastomeric material. The chain transfer agent can include, for example, an alkylmercaptan containing from 5 to 20 carbon atoms. The amount of the chain transfer agent in the recipe is 5 weight percent or less and, in another embodiment, 3 weight percent or less based on the entire weight of the elastomeric material. In the case where the amount exceeds 5 weight percent, the amount of the non-crosslinked portion in the rubber particle core increases, which may result in undesired effects on the heat resistance, rigidity, etc. of the composition when it is incorporated into an epoxy resin composition.

A polysiloxane type elastomer may be used in place of the elastomeric material described above as the rubber particle core or in combination therewith. In the case where the polysiloxane type elastomer is used as the rubber particle core, a polysiloxane type elastomer constituted of dialkyl or diaryl substituted silyloxy unit, for example, dimethyl silyloxy, methylphenyl silyloxy, and diphenyl silyloxy can be used. In an embodiment, when using such a polysiloxane type elastomer, a crosslinked structure can be introduced by using a polyfunctional alkoxy silane compound or with radial polymerization of silane compound having a vinylic reactive group.

Shell Layer

The shell layer can provide the affinity to the rubbery polymer particles for the particles to be stably dispersed in the form of primary particles in the epoxy resin component.

The polymer constituting the shell layer is graft polymerized with the polymer constituting the rubber particle core in an embodiment, substantially forming a chemical bond with the polymer constituting the core. For facilitating production of the composition containing the epoxy resin component according to the production process of this invention, at least 70 weight percent in one embodiment, at least 80 weight percent in another embodiment, and at least 90 weight percent in yet another embodiment, of the polymer constituting the shell layer is bonded with the core.

In an embodiment, the shell layer has limited swellability, compatibility or affinity to the epoxy resin component to facilitate mixing and dispersion of the rubbery polymer particles in the resins.

In another embodiment, the shell layer has non-reactive functional groups with epoxide, but optionally reactive functional groups capable of forming chemical bonds with epoxy hardeners, such as amines and anhydrides, under conditions where the epoxy resins react with the curing agents are also suitable.

In an embodiment, the polymer constituting the shell layer is a polymer or copolymer obtained by polymerizing or copolymerizing one or more ingredients selected from the group consisting of (meth)arcylic esters, aromatic vinyl compounds, vinyl cyanate compounds, unsaturated acid derivatives, (meth)acrylamide derivatives and maleimide derivatives. Particularly, in embodiments where chemical reactivity is required for the shell layer during curing of the epoxy composition, it is preferred to use a copolymer obtained by copolymerizing one or more of monomers containing one or more of reactive functional groups selected from carboxyl groups, hydroxyl groups, carbon-carbon double bonds, anhydride groups, amino groups or amide groups which can react with the epoxy composition, or a curing agent thereof, or a curing catalyst thereof, etc., in addition to alky(meth)arcylic esters, aromatic vinyl compounds or vinyl cyanate compounds. In an embodiment, the functional group is at least one reactive functional group selected from the group consisting of an epoxy group, a carboxyl group, an amino group, an anhydride group, a hydroxyl group, or a carbon-carbon double bond.

Examples of the (meth)arcylic esters that can be used include, but are not limited to alkyl(meth)acrylate esters such as methyl(meth)acrylate, ethyl(meth)acrylate, butyl (meth)acrylate, and 2-ethylhexyl(meth)acrylate. Examples of the aromatic vinyl compounds include, but are not limited to styrene, α-methylstyrene, alkyl-substituted styrene, and halogen-substituted styrenes such as bromo styrene or chloro styrene. Examples of vinyl cyanate compounds include, but are not limited to (meth)acrylonitrile and substituted acrylonitrile. Examples of the monomers containing the reactive functional group include, but are not limited to 2-hydroxylethyl(meth)acrylate, 2-aminoethyl(meth)acrylate, glycidyl(meth)acrylate, and (meth)acrylate esters having a reactive side chain. Examples of the vinyl ether containing a reactive group include but are not limited to glycidyl vinyl ether and allyl vinyl ether. Examples of the unsaturated carboxylic acid derivatives include but are not limited to (meth)acrylic acid, itaconic acid, chrotonic acid and maleic acid anhydride. Examples of (meth)acrylamide derivatives include, but are not limited to (meth)acrylamide (including N-substituted products). Examples maleimide derivatives include but are not limited to maleicacid imide (including N-substitution products).

The weight ratio of the core layer to the shell layer of a preferred rubber particle is generally in the range of from 40/60 to 95/5, in the range of 50/50 to 95/5 in another embodiment, and is in the range of from 60/40 to 85/15 in yet another embodiment. In a case where the core/shell weight ratio is outside of 40/60 and the amount of the rubber particle core layer is lower than that of the shell layer, then improvement in toughness of an epoxy thermoset containing the rubber particle dispersion tends to be lower. On the other hand, in cases where the ratio is outside of 95/5 and the amount of the shell layer is lower than that of the core layer, it can result in problems in the production process during coagulation and the expected properties may not be obtained.

The rubbery polymer particles (B) can be produced by a well-known method, for example, emulsion polymerization, suspension polymerization, or micro-suspension polymerization. Among them, a production process by the emulsion polymerization is suitable from the view point that it is easy to design composition of the rubbery polymer particles (B), and it is easy to produce the particles at an industrial scale and maintain quality of the rubbery polymer particles suitable to the process of this invention. As the emulsifying or dispersing agent in an aqueous medium, it is preferred to use those that maintain emulsifying or dispersion stability even in the case where pH of the aqueous latex is neutral. Specifically, they include, for example, nonionic emulsifier or dispersant such as alkali metal salts or ammonium salts of various acids, for example, alkyl or aryl sulfonic acids typically represented by dioctyl sulfosuccinic acid or dodecylbenzene sulfonic acid, alkyl or aryl sulfonic acid typically represented by dodecyl sulfonic acid, alkyl or aryl ether sulfonic acid, alkyl or aryl substituted phosphoric acid, alkyl or aryl ether substituted phosphoric acid, or N-alkyl or aryl sarcosinic acid typically represented by dodecyl sarcosinic acid, alkyl or aryl carboxylic acid typically represented by oleic acid or stearic acid, alkyl or aryl ether carboxylic acids, and alkyl or aryl substituted polyethylene glycol, and dispersant such as polyvinyl alcohol, alkyl substituted cellulose, polyvinyl pyrrolidone or polyacrylic acid derivative. They may be used alone or in combination of two or more.

Examples of commercially available core shell rubber particles include, but are not limited to, PARALOID™ EXL 2300G, PARALOID™ EXL 2314, PARALOID™ EXL 2611, PARALOID™ EXL 2650A, and PARALOID™ EXL 2691A produced by Dow Plastics Additives, and Kane Ace Modifiers, produced by Kaneka.

It is preferred that the core shell rubber, component (B), is in the range of from 2 to 25 weight percent based on the total weight of the composition and is in the range of from 5 to 15 weight percent in another embodiment. If the content is lower than 2 weight percent, enhancement of the fracture toughness is decreased. If the content is larger than 25 weight percent, the viscosity of the epoxy resin composition can become too high, which can make it difficult to use with standard processes in the industry.

Hardener

Any suitable epoxy hardener can be used. Examples of epoxy hardeners that can be used include, but are not limited to aliphatic amines, modified aliphatic amines, cycloaliphatic amines, modified cycloaliphatic amines, amidoamines, polyamide, tertiary amines, aromatic amines, anhydrides, mercaptans, cyclic amidines, isocyanates cyanate esters, and the like. Suitable hardeners include Bis(4-aminocyclohexyl)methane (AMICURE® PACM), diethylenetriamine (DETA), triethylenetetramine (TETA), aminoethylpiperazine (AEP), isophorone diamine (IPDA), 1,2-diaminocyclohexane (DACH), 4,4'-diaminodiphenylmethane (MDA), 4,4'-diaminodiphenylsulfone (DDS), m-phenylenediamine (MPD), diethyltoluenediamine (DETDA), metda-xylene diamine (MXDA), bis(aminomethyl cyclohexane), dicyandiamide, phthalic anhydride (PA), tetrahydrophthalic anhydride (THPA), methyltetrahydrophthalic anhydride (MTHPA), methyl hexahydrophthalic anhydride (MHHPA), hexahydrophthalic anhydride (HHPA), nadic methyl anhydride (NMA), benzophenonetetracarboxylic dianhydride (BTDA), tetrachlorophthalic anhydride (TCPA), and the like, and mixtures thereof.

The hardener is present in the composition in the range of from 5 weight percent to 60 weight percent in one embodiment, and is present in the range of from 20 weight percent to 50 weight percent in another embodiment, based on the total weight of the composition.

Optional Components

Optionally, catalysts may be added to the curable compositions described above. Catalysts may include, but are not limited to, imidazole compounds including compounds having one imidazole ring per molecule, such as imidazole, 2-methylimidazole, 2-ethyl-4-methylimidazole, 2-undecylimidazole, 2-heptadecylimidazole, 2-phenylimidazole, 2-phenyl-4-methylimidazole, 1-benzyl-2-methylimidazole, 2-ethylimidazole, 2-isopropylimidazole, 2-phenyl-4-benzylimidazole, 1-cyanoethyl-2-methylimidazole, 1-cyanoethyl-2-ethyl-4-methylimidazole, 1-cyanoethyl-2-undecylimidazole, 1-cyanoethyl-2-isopropylimidazole, 1-cyanoethyl-2-phenylimidazole, 2,4-diamino-6-[2'-methylimidazolyl-(1)']-ethyl-s-triazine, 2,4-diamino-6-[2'-ethyl-4-methylimidazolyl-(1)']-ethyl-s-triazine, 2,4-diamino-6-[2'-undecylimidazolyl-(1)']-ethyl-s-triazine, 2-methyl-imidazolium-isocyanuric acid adduct, 2-phenylimidazolium-isocyanuric acid adduct, 1-aminoethyl-2-methylimidazole, 2-phenyl-4,5-dihydroxymethylimidazole, 2-phenyl-4-methyl-5-hydroxymethylimidazole, 2-phenyl-4-benzyl-5-hydroxymethylimidazole and the like; and compounds containing 2 or more imidazole rings per molecule which are obtained by dehydrating above-named hydroxymethyl-containing imidazole compounds such as 2-phenyl-4,5-dihydroxymethylimidazole, 2-phenyl-4-methyl-5-hydroxymethylimidazole and 2-phenyl-4-benzyl-5-hydroxymethylimidazole; and condensing them with formaldehyde, e.g., 4,4'-methylene-bis-(2-ethyl-5-methylimidazole), and the like.

In other embodiments, suitable catalysts may include amine catalysts such as N-alkylmorpholines, N-alkylalkanolamines, N,N-dialkylcyclohexylamines, and alkylamines where the alkyl groups are methyl, ethyl, propyl, butyl and isomeric forms thereof, and heterocyclic amines.

Process for Producing the Composition

In another embodiment, the core shell rubber particles are dispersed in oxazolidone-modified epoxies using common mechanical mixing equipment. Examples of mixing equipment that can be used include, but are not limited to high shear dispersers, extruders, and rotor stators In an embodiment, core shell rubber particles are pre-dispersed in a liquid epoxy resin using a high shear process known in the art to form a masterbatch dispersion. This masterbatch dispersion is then diluted to the designated amount of core shell rubber in the final formulation by the same liquid epoxy resin and is mixed with the solid epoxy resin containing the oxazolidone ring structure.

The composition can be cured by any suitable method known in the art.

End Use Applications

End uses for the cured composition include, but are not limited to prepregs, coatings, composites, electrical laminates, and electronic adhesives.

EXAMPLES

The following raw materials were used:

D.E.R.™ 858—(termed as"DER 858"), a solid epoxy resin available from the Dow Chemical Company.

D.E.R.™ 383—(termed as"DER 383"), a bisphenol A liquid epoxy resin available from the Dow Chemical Company.

D.E.N.™ 438—(termed as"DEN 438"), a multifunctional epoxy novoloc resin available from the Dow Chemical Company.

PARALOID™ EXL 2650A, a core shell rubber, available from the Dow Chemical Company.

Divinylbenzene dioxide (termed "DVBDO"), a 1,4-di(oxiran-2-yl)benzene and 1,3-di(oxiran-2-yl)benzene available from the Dow Chemical Company.

4,4'-diaminodiphenylsulphone (termed "4,4-DDS") an aromatic amine hardener, available from Sigma-Aldrich.

ECA 100, a liquid methyltetrahydrophthalic anhydride based anhydride hardener available from the Dixie Chemical Company.

2-ethyl-4-methyl imidazole, an imidazole catalyst for anhydride cured epoxy formulations, available from Sigma-Aldrich.

In the following Examples, the following test methods were used:

The glass transition temperature ($T_g$) of each cured epoxy system was measured by differential scanning calorimetry (DSC) under a nitrogen atmosphere (flow rate=80 ml/min) scanning from 60 to 270° C. A heating rate of 10° C./min was used. The midpoint temperature during the heat-capacity transition on the $2^{nd}$ scan was reported as $T_g$.

Fracture toughness ($K_{IC}$): A screw-driven material testing machine (model 5567, Instron) was used according to ASTM D5045. The tests were performed under the monotonic loading condition and room temperature. The three-point-bending (3PB) geometry was chosen for testing the specimens with nominal dimensions of 12.7 mm×3.0 mm×75.0 mm. At least 5 specimens were tested for each formulation.

Fracture energy ($G_{IC}$) was calculated by using equation 1, where E is the Young's modulus and v is the Poisson's ratio. It was assumed that v was equal to 0.34 for the cured epoxy matrices.

$$G_{IC} = \frac{K_{IC}^2}{E}(1-v^2) \qquad \text{Equation 1}$$

Preparation of Examples

Comparative Examples A-D and Examples 1-2 were prepared in the following manner: PARALOID™ EXL 2650A was pre-dispersed in DER 383 by high shear mixing. The thermosettable resin composition was prepared by blending DER 858 with a predetermined amount of DER 383 with mild mechanical stifling at 130° C. The addition of 4,4-DDS was accompanied by a short stirring followed by vacuum degassing. The mixture was poured into a 150° C. preheated stainless-steel mold and cured in a forced air circulation oven to form the clear casting plaque for further tests. The cure schedule was 155° C./1 hr, 177° C./2 hr and 220° C./4 hr, 250° C./2 hr.

Comparative Examples E-F, and Examples 3-4 were prepared in the following manner: DER 858 was dispersed and melted in DVBDO at 80° C. which yielded a clear epoxy blend. A predetermined amount of PARALOID™ EXL 2650A was dispersed in ECA-100. Prior to the addition of the catalyst, 2-ethyl-4-methyl imidazole, the epoxy blend was mixed with the mixture of the core-shell rubber and hardener. The final mixture was poured into a 70° C. preheated stainless-steel mold. The epoxy thermosets were gradually cured in a forced air circulation oven up to 140° C. within 8 hours and were post cured at 170° C. for 2 hours. The type and amount of each component used in the Examples and Comparative Examples are shown in Tables 1 and 2, below.

Characterizations

Examples 1 and 2 and the controls were characterized according to the test methods above. The toughenability, $\Delta K_{IC}$ ($K_{IC\ filled}-K_{IC\ unfilled}$) is insignificant in the Control that contains only CSR particles, while the CSR-filled Example 2, which contains 70 phr (part per hundred parts of resin) of D.E.R.™ 858 and CSR, has a $K_{IC}$ of 1.58 MPa*m$^{0.5}$, a 78% improvement. The results of the characterizations are show n in Tables 1 and 2, below. FIG. 1 shows the performance difference between the Control and Examples 1 and 2.

TABLE I

Components and Performance of 4,4 DDS cured epoxy thermosets

| | DER ™ 858 (g) | DER ™ 383 (g) | 25 wt % CSR in DER 383 (g) | DDS (g) | $T_g$ (° C.) | $K_{IC}$ (MPa * m$^{0.5}$) |
|---|---|---|---|---|---|---|
| Comparative Example A | 0.0 | 210.0 | 0.0 | 66.1 | 223 | 0.77 ± 0.03 |
| Comparative Example B | 0.0 | 140.0 | 79.8 | 62.9 | 226 | 0.99 ± 0.02 |
| Comparative Example C | 150.0 | 183.8 | 0.0 | 79.0 | 210 | 0.88 ± 0.07 |
| Comparative Example D | 150.0 | 64.3 | 0.0 | 41.4 | 200 | 0.88 ± 0.08 |
| Example 1 | 140.0 | 0.0 | 80.1 | 38.7 | 197 | 1.58 ± 0.091:1 |
| Example 2 | 101.4 | 90.0 | 57.0 | 53.5 | 207 | 1.36 ± 0.05 |

TABLE II

| | \multicolumn{6}{c|}{Components and Performance of anhydride cured epoxy thermosets} | | | |
|---|---|---|---|---|---|---|---|---|---|
| | DER 858 (g) | DVBDO (g) | DER 383 (g) | DEN 438 (g) | MTHPA (g) | 2E4MI (g) | CSR | $T_g$ (°C.) | $K_{IC}$ (MPa * m$^{0.5}$) |
| Comparative Example E | 0 | 0 | 107 | 0 | 98.1 | 4.1 | 16.2 g, 7.3 wt. % | 119 | 1.93 ± 0.07 |
| Comparative Example F | 0 | 0 | 0 | 107 | 103.2 | 4.2 | 16.2 g, 7.2 wt. % | 167 | 1.15 ± 0.07 |
| Example 3 | 45.5 | 45.5 | 0 | 0 | 112.2 | 4.1 | 16.0 g, 7.3 wt. % | 164 | 1.33 ± 0.08 |
| Example 4 | 85.7 | 36.7 | 0 | 0 | 102.2 | 4.5 | 17.8 g, 7.2 wt. % | 158 | 1.77 ± 0.07 |

The invention claimed is:

1. A composition consisting of:
   (a) an epoxy resin composition comprising:
      (i) a first epoxy component comprising an epoxy resin having at least one oxazolidone ring structure; and
      (ii) a second epoxy component selected from the group consisting of a liquid epoxy resin, a divinylarene dioxide, and combinations thereof;
   (b) a core-shell rubber comprising a rubber particle core and a shell layer, and
   (c) a hardener.

2. A composition in accordance with claim 1, wherein the first epoxy component is a reaction product of I) an epoxy resin and II) a polyisocyanate.

3. A composition in accordance with claim 2, wherein the polyisocyanate is methylene diphenyl diisocyanate.

4. A composition in accordance with claim 1 wherein the epoxy resin composition (a) is present in an amount in the range of from 40 weight percent to 93 weight percent, the core-shell rubber (b) is present in an amount in the range of from 2 weight percent to 25 weight percent, and the hardener (c) is present in an amount in the range of from 5 weight percent to 58 weight percent, based on the total weight of the composition.

5. A composition in accordance with claim 1, wherein the core shell rubber has a core selected from the group consisting of a butadiene core, a silicone core, a butadiene-styrene copolymer core, and combinations thereof.

6. A composition in accordance with claim 1, wherein the core shell rubber has a shell selected from the group consisting of a methyl methacrylate shell, a styrene shell, and combinations thereof.

7. A composition in accordance with claim 1, wherein the liquid epoxy resin is selected from the group consisting of bisphenol A, bisphenol F, cycloaliphatic epoxies, biphenol epoxy resins, N,N-Diglycidyl-4 glycidyloxyaniline, 4,4'-methylenebis(N,N-diglycidylaniline), and pentaerythritol tetraglycidyl ether.

8. A composition in accordance with claim 1, wherein the divinylarene dioxide is divinylbenzene dioxide.

9. A process for preparing the composition of claim 1 comprising:
   (a) dispersing the core shell rubber into a liquid epoxy resin to form a dispersion; and
   (b) contacting the dispersion with an isocyanate to form an oxazolidone ring-containing solid epoxy resin.

10. A process in accordance with claim 9 wherein the contacting in step b) is performed in a reaction zone under reaction conditions.

11. A process in accordance with claim 9 comprising dispersing the core shell rubber into the isocyanate modified, oxazolidone ring-containing solid epoxy resin in a mixing apparatus.

12. A prepreg made from the composition of claim 1.

13. A coating made from the composition of claim 1.

14. A composite made from the composition of claim 1.

15. An electrical laminate made from the composition of claim 1.

16. An electronic adhesive made from the composition of claim 1.

* * * * *